United States Patent [19]

Caccioli et al.

[11] 4,104,776
[45] Aug. 8, 1978

[54] AUTOMOTIVE PRESS

[75] Inventors: Anthony Caccioli, Longmeadow, Mass.; Philip A. Carlson, Glastonbury, Conn.; David M. Guidi, Springfield, Mass.

[73] Assignee: Gulf & Western Manufacturing Company, Southfield, Mich.

[21] Appl. No.: 838,031

[22] Filed: Sep. 29, 1977

[51] Int. Cl.² ............................................. B25B 27/14
[52] U.S. Cl. ...................................... 29/281.3; 29/251; 100/257
[58] Field of Search .................... 29/251, 281.1, 281.3; 100/257

[56] References Cited

U.S. PATENT DOCUMENTS

| 2,706,330 | 4/1955 | Nelson | 29/281.3 |
| 3,766,627 | 10/1973 | Headman | 29/281.3 |

*Primary Examiner*—James L. Jones, Jr.
*Attorney, Agent, or Firm*—Gregory J. Battersby; Thomas E. Harrison, Jr.; Charles I. Sherman

[57] ABSTRACT

A center column press is provided for use in automobile related applications. The press includes a center column mounted on a base with a vertically extending center wall interconnecting two opposed, vertically extending side walls to define at least one vertically extending channel on each side of the center wall. Press means are mounted within one of the channels and include a moveable ram adapted to travel in a vertical direction to effect a pressing operation. An adjustable work table is adjustably mounted in said one channel between the press means and the base and may include an adjustable, self-storing leveling bar. A nesting block is pivotably mounted within said one channel between said press means and said work table. Storage means are provided within said other channel for press tooling.

19 Claims, 11 Drawing Figures

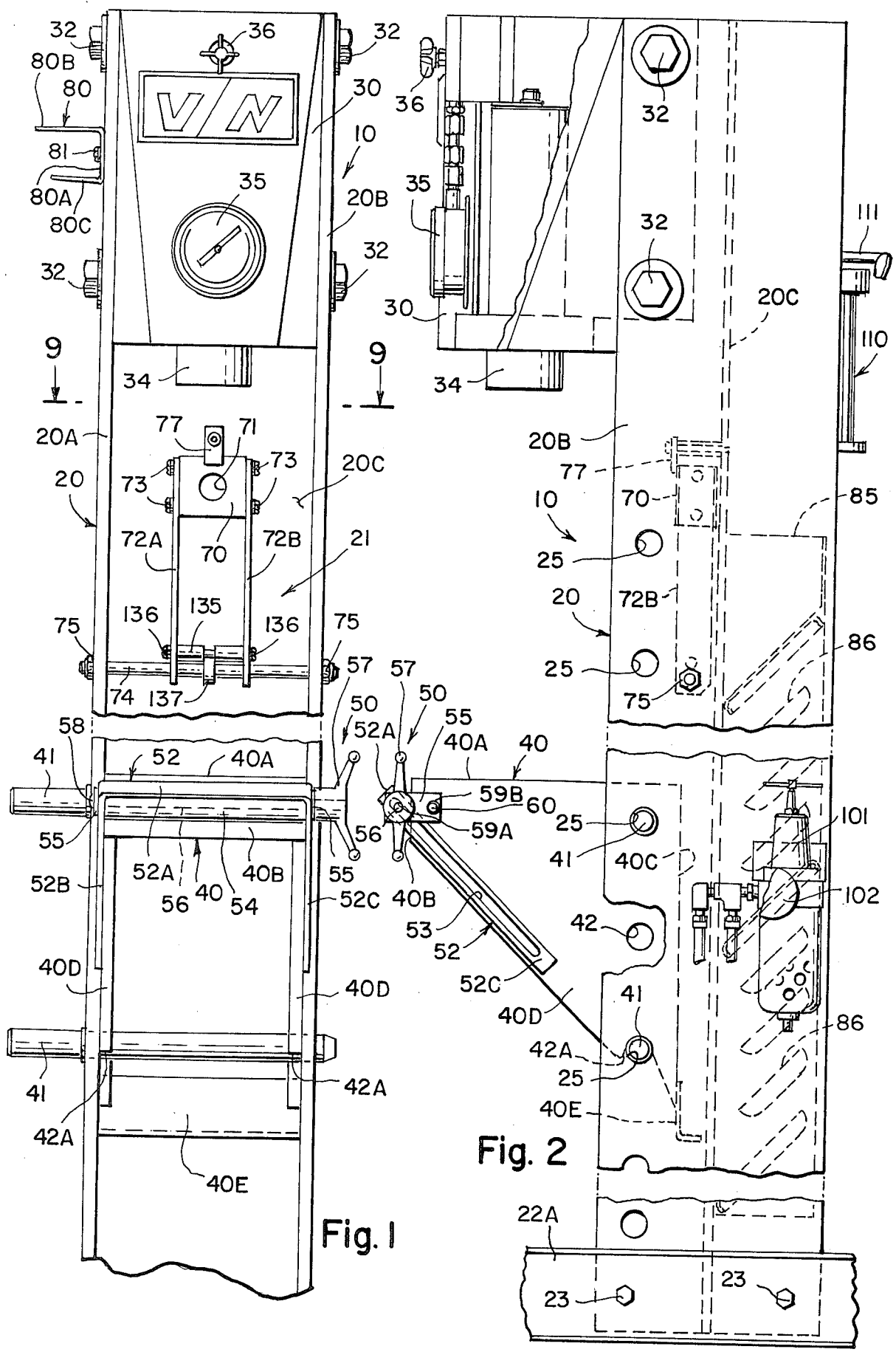

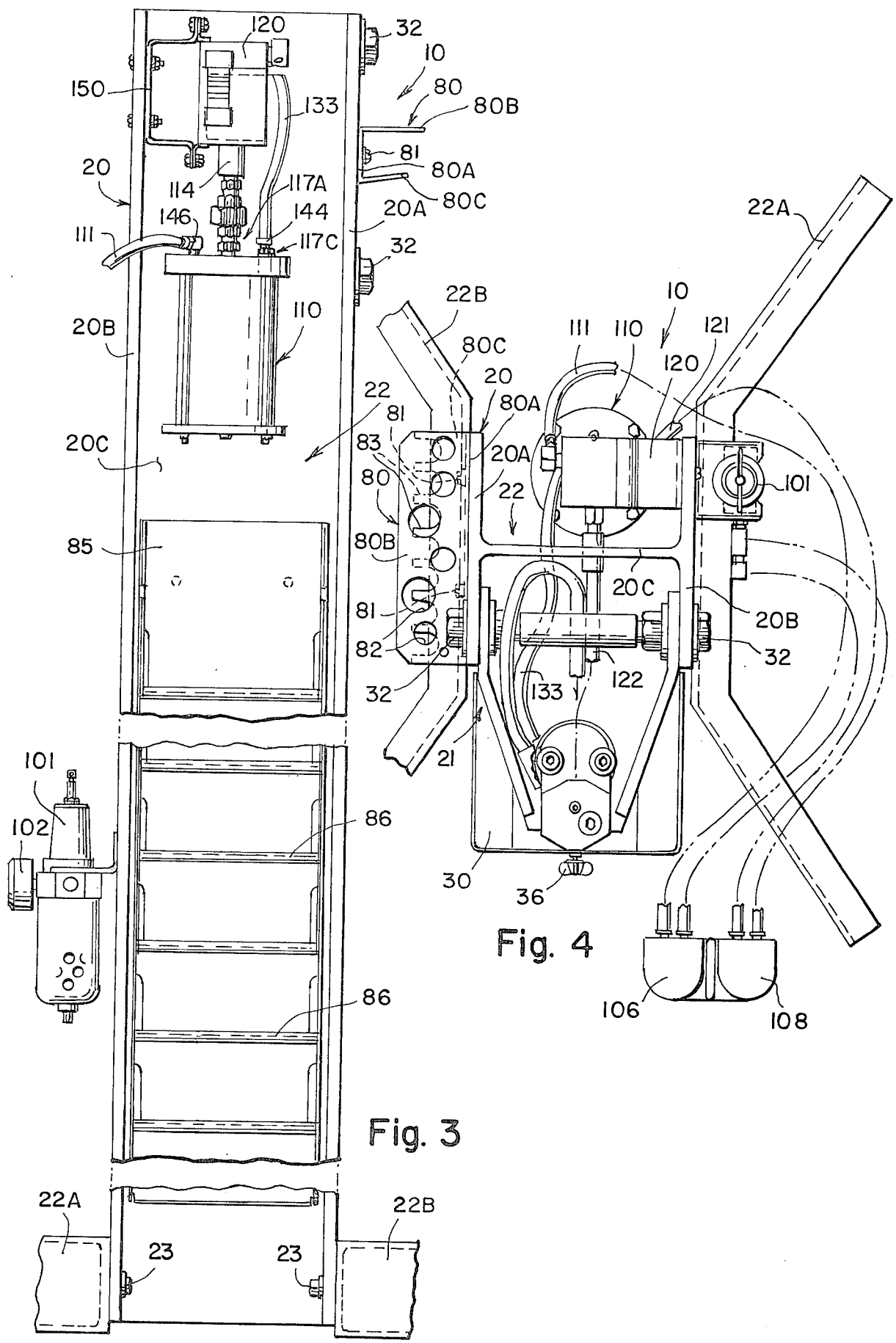

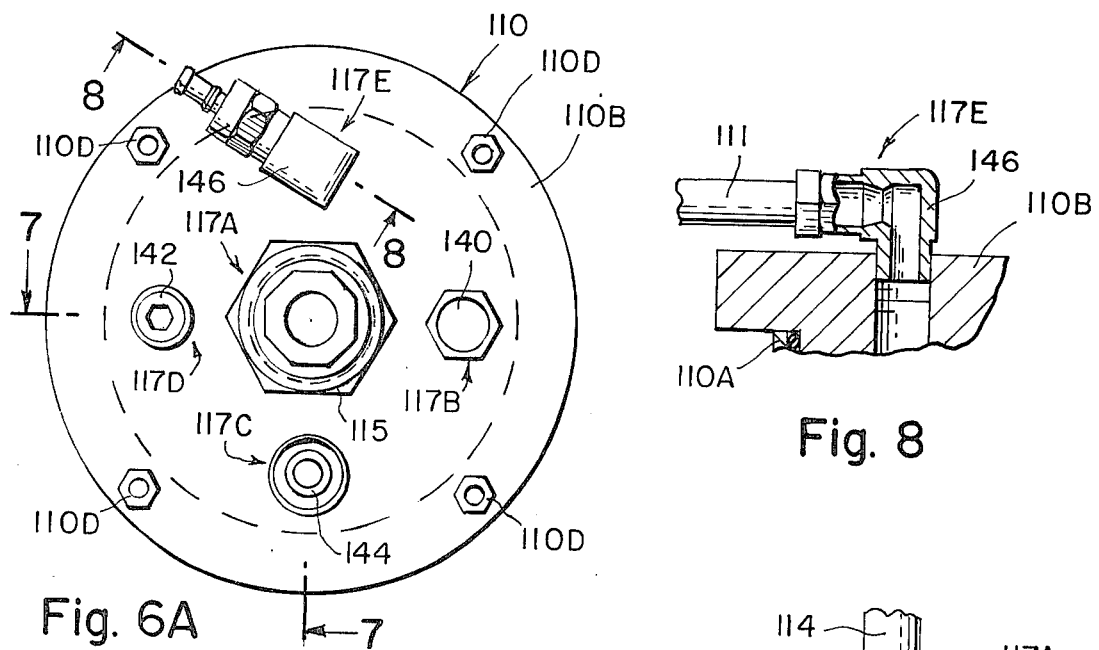
Fig. 8
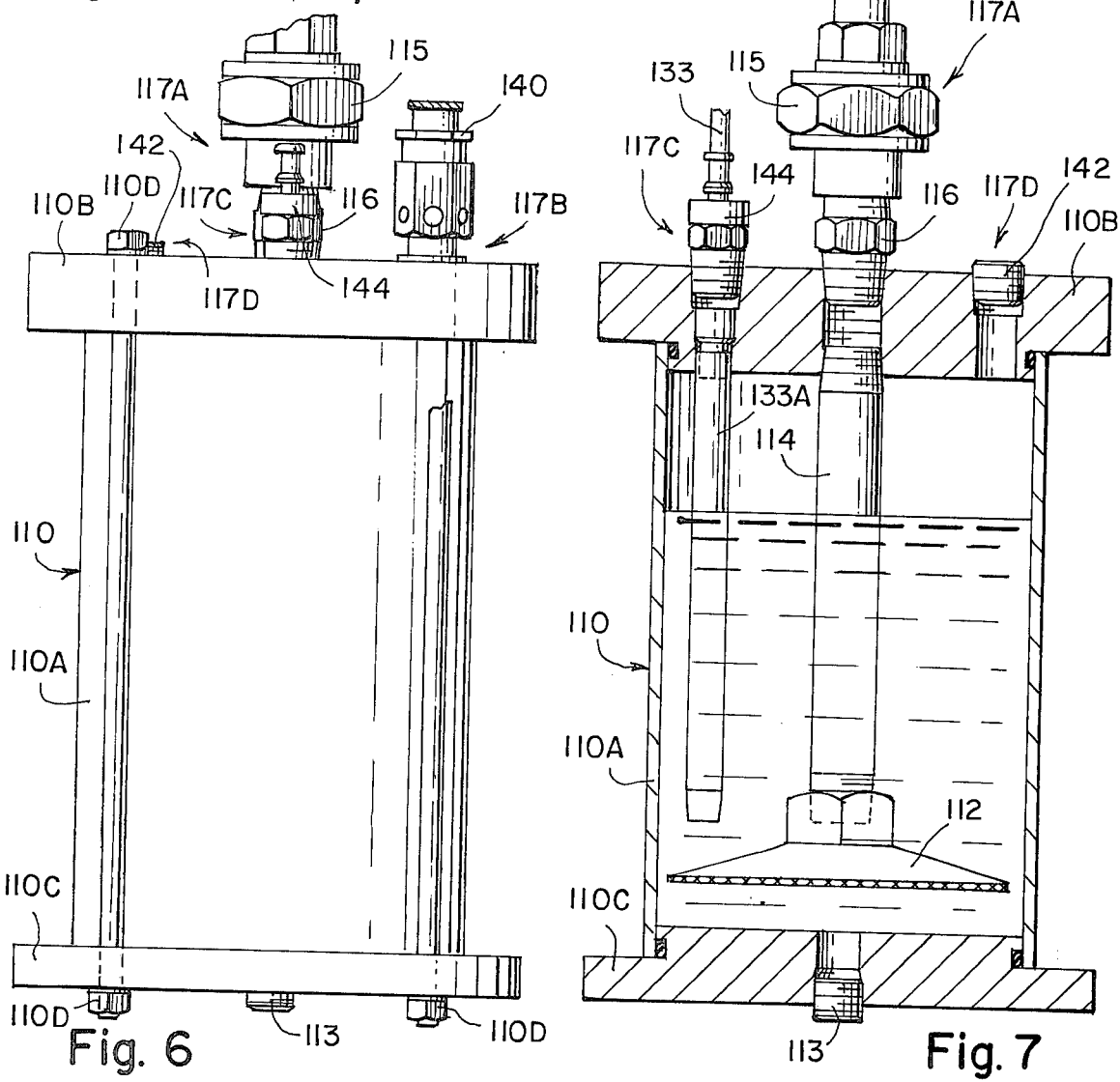
Fig. 6A
Fig. 6
Fig. 7

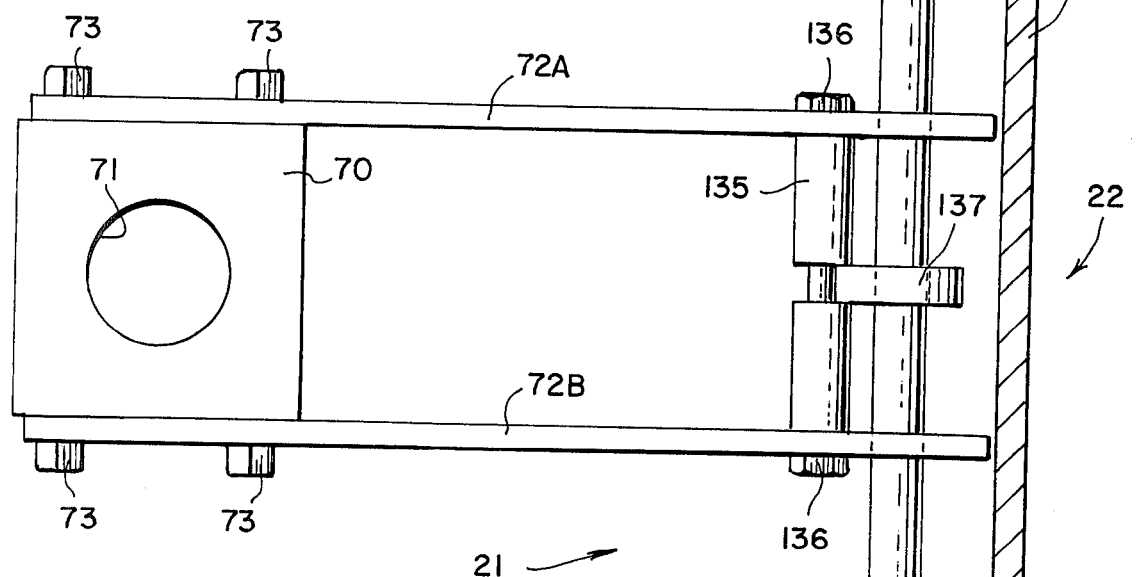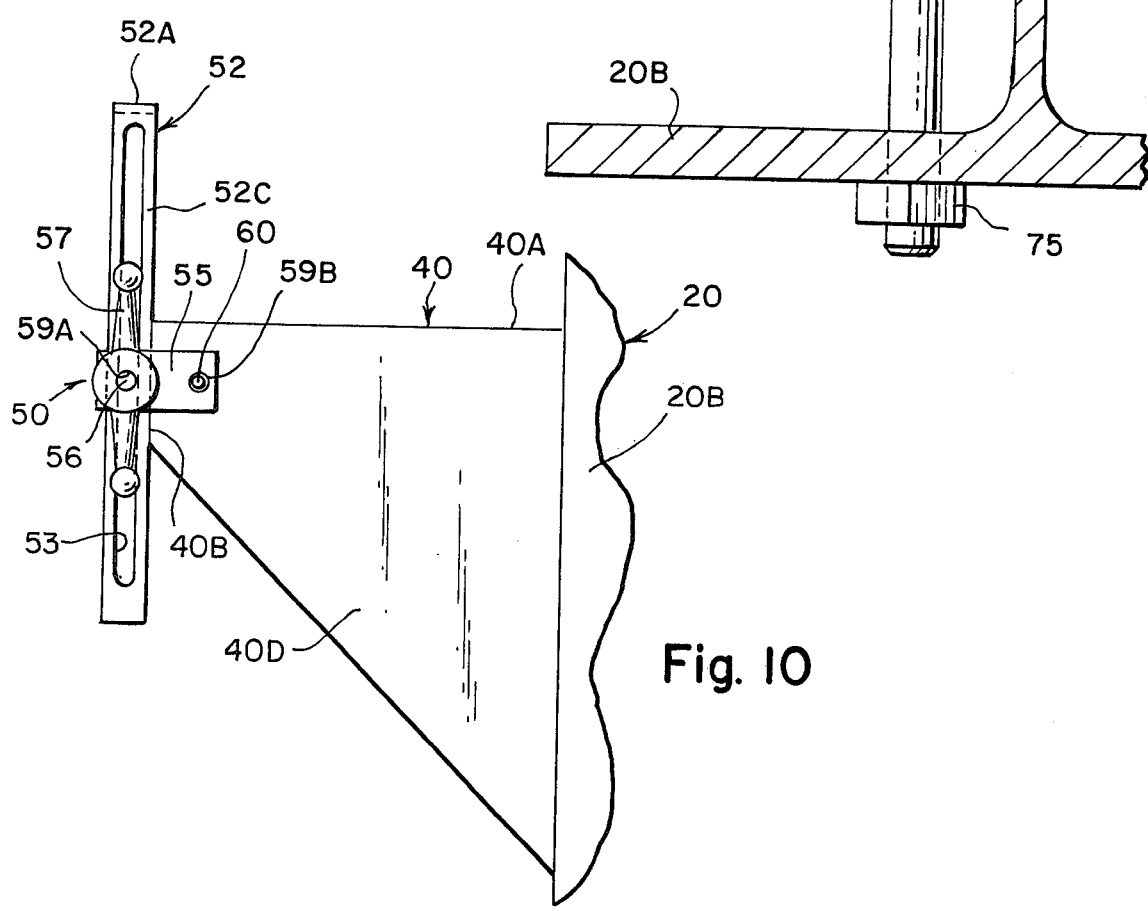

AUTOMOTIVE PRESS

BACKGROUND OF THE INVENTION

The present invention relates generally to an automotive press and, more particularly, to a "C" frame column press for use in performing brake hub and drum and axle and bearing work. The press of the present invention includes storage means for press tooling; a self-storing nesting block and an adjustable work table which includes a self-storing leveling bar to support work pieces mounted on the work table.

Presses are commonly required in automotive repair shops to effect a variety of functions including the removal and replacement of brake hub studs, disc brake rotors, axle bearings and studs in the flanges of automobile axles. Presses are also commonly used for the placement of piston pins and in universal joint work.

Heretofore, most automotive presses were of the "H" frame configuration with a horizontally extending work table extending between two vertically extending sides. The work table, which was extremely heavy, could be adjusted vertically only by removing the pins securing it to the sides of the press and physically raising or lowering it. Such an operation, due to the weight of the table, generally required a winch or other mechanical assistance device. Since in actual use different operations require that the work table be set in different positions, the difficulty in moving the work table on such presses has made the use of such presses extremely difficult due to the effort required. An additional problem presented with such "H"-frame presses is that almost none of the commercial presses heretofore used, provide a support or leveling device as an integral part of the press. Since some work pieces are quite large and cumbersome, in order to effect a pressing operation, an operator frequently had to improvise some method of supporting or leveling the workpiece during the pressing operation.

Further, since such presses are adapted to perform numerous pressing operations, many different types of press tooling or fixtures are required for use in these different pressing operations. The "H"-frame presses in commercial use today do not include any type of storage means for this tooling thus requiring that a separate storage area be maintained for such tooling or fixtures. Such storage area must be relatively close to the press because of the weight of these fixtures.

Another problem frequently experienced with automotive presses in use today is lack of precise control of the ram rapid advance. Other problems have been experienced in the hydraulic versions thereof due to agitation of the hydraulic fluid upon the introduction of air under pressure into the reservoir.

Against the foregoing background, it is a primary objective of the present invention to provide a column type automotive press which includes an adjustable work table.

It is another objective of the present invention to provide an automotive press which includes a self-storing nesting block for use in operation of the press.

It is still another objective of the present invention to provide an automotive press which includes storage means for tooling fixtures used in the operation of the press.

It is yet still another objective of the present invention to provide an automotive press which includes an adjustable, self-storing work support and leveling mechanism for use in the operation of the press.

It is a further objective of the present invention to provide a hydraulic automotive press which permits rapid advance of the press ram under light resistance and slow advance with heavier resistance.

SUMMARY OF THE INVENTION

To the accomplishments of the foregoing objects and advantages, the present invention briefly comprises a center column press for use in automobile related applications. The press includes a center column mounted on a base with a vertically extending center wall interconnecting two opposed, vertically extending side walls to define at least one vertically extending channel on each side of the center wall. Press means are mounted within one of the channels and include a moveable ram adapted to travel in a vertical direction to effect a pressing operation. An adjustable work table is adjustably mounted on said one channel between the press means and the base and may include an adjustable, self-storing leveling or support bar. A nesting block is pivotably mounted within said one channel between said press means and said work table. Storage means are provided within said other channel for press tooling.

BRIEF DESCRIPTION OF THE DRAWINGS

The foregoing and still other objects and advantages of the present invention will be more apparent from the following detailed explanation of the invention in connection with the accompanying drawings wherein:

FIG. 1 is a front view of the automotive press of the present invention;

FIG. 2 is a side view thereof;

FIG. 3 is a back view thereof;

FIG. 4 is a top view thereof;

FIG. 6 is an enlarged side view of the reservoir used in the hydraulic system of FIG. 5;

FIG. 6A is a top view of the reservoir of FIG. 6;

FIG. 7 is a section view taken along line 7—7 of FIG. 6A;

FIG. 8 is a section view taken along line 8—8 of FIG. 6A;

FIG. 9 is an exploded top section view taken along line 9—9 of FIG. 1 showing the nesting block of the present invention in an operational position, and FIG. 10 is an exploded side view of the self-storing support bar as it is mounted in an operating position on the work table.

DETAILED DESCRIPTION OF THE INVENTION

Figure 5:
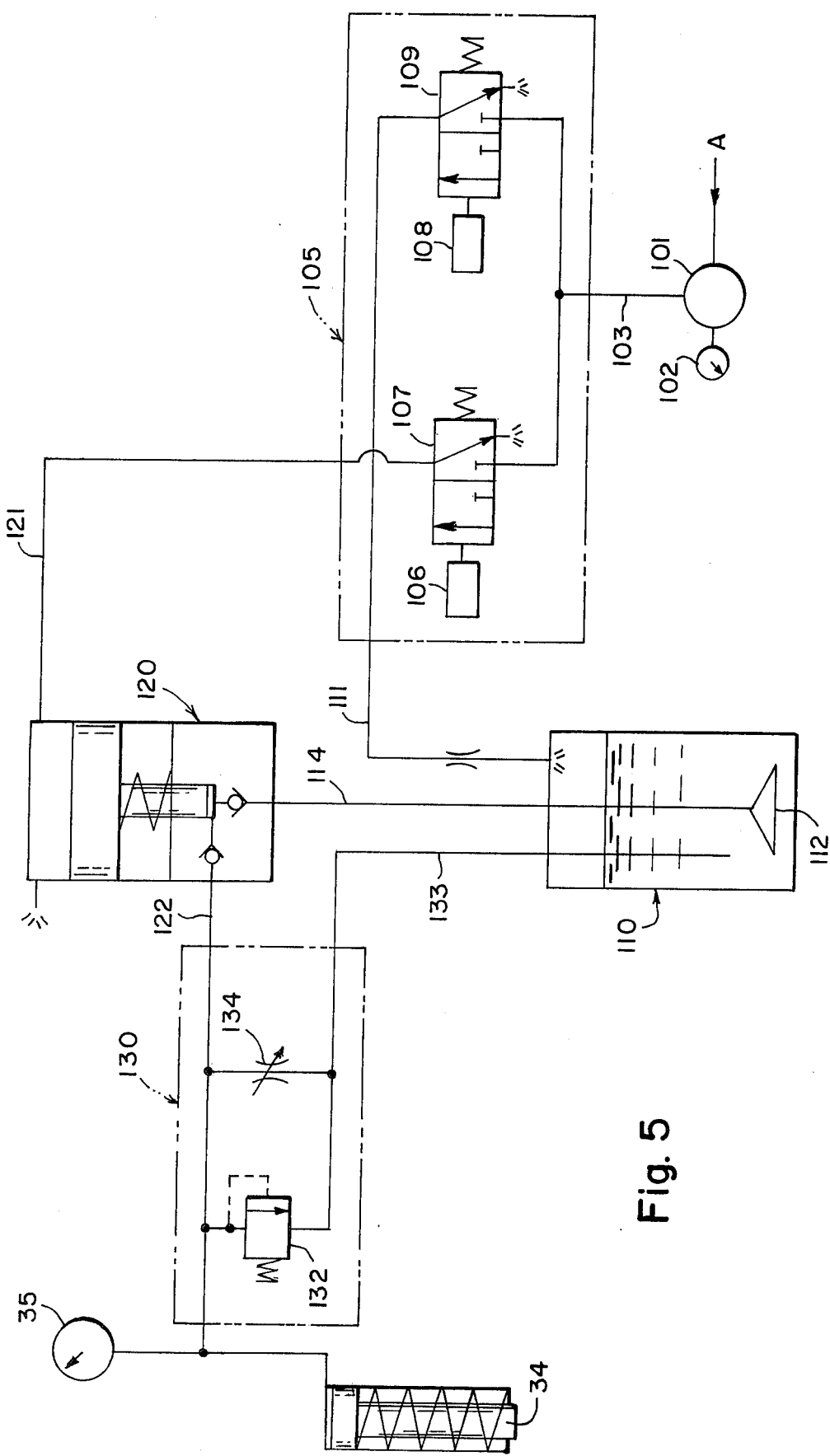
FIG. 5 is a schematic illustration of the hydraulic system used in the hydraulic version of the press of the present invention.

Referring now to the drawings and, in particular, to FIGS. 1 through 4, thereof, there is shown the column type automotive press of the present invention referred to generally by reference numeral 10.

Press 10 comprises a longitudinally extending center column 20, preferably of steel, having two vertically extending, opposed side walls 20A and 20B inter-connected by a vertically extending center wall 20C to define front and rear "C" shaped channels 21 and 22 respectively, on either side of the center wall 20C of approximately the same dimension and configuration. Center column 20 is supported in a vertical position by a base having two horizontal, angular beams 22A and 22B, each secured to one wall of the column 20 by a plurality of bolts 23. Each of the side walls 20A and 20B include along their longitudinal extent a plurality of apertures 25 for use in mounting a work table thereon. The apertures 25 are so positioned that when the walls are mounted on the base, the apertures 25 of both side walls 20A and 20B are in horizontal alignment.

Mounted within the front channel 21 of column 20 at its top end opposite the base is a ram housing 30 secured to the side walls 20A and 20B by a plurality of bolts 32. Ram housing 30 includes mounted within it, a moveable press ram 34 adapted to be raised and lowered in a vertical direction using conventional means to effect a pressing operation. A conventional pressure gauge 35 and release valve 36 are provided to assist the operator in the operation of the press. Ram 34 may be powered by hydraulic means or by conventional mechanical means. In the embodiment wherein the ram 34 is powered by hydraulic means, a hydraulic pump system may be mounted in the rear channel 22. This pump system will be described in greater detail.

A generally triangularly or knee shaped, adjustable work table 40, preferably of steel, is provided for adjustably mounting on the front channel 21 of the center column 20. Work table 40 has an upper, work surface portion 40A and two opposed front and back portions 40B and 40C extending at right angles from the top surface 40A. Back portion 40C is significantly larger than front portion 40B. Top, front and back portions 40A, 40B and 40C are interconnected and substantially enclosed on both sides by two opposed side portions 40D. In this manner the upper work surface 40A, the back portion 40C and the bottom portion are all open. A plurality of apertures 42 are provided on both side portions 40D toward the back portion 40C, the apertures 42 of one side portion 40D being in alignment with the apertures of the opposed side portion. The spacing between apertures 42 on the side portions 40D of the work table is the same as the spacing between the apertures 25 on the side walls 20A and 20B of the center column 20. In this manner, by positioning the work table 40 within the front channel 21 such that the apertures 25 and 42 are aligned, the work table 40 may be secured thereto by the insertion of pins 41 through the aligned apertures. The use of two pins 41 is preferred. As shown in FIG. 2, the bottom-most aperture 42A on each side portion 40D of the work table 40 are open at their bottom ends to permit easy realignment of the work table 40. When the operator wishes to realign or change the position of the work table 40, the pin 41 is removed from the top most aperture 42 of the work table 40 and column 20 thus releasing the top portion of the work table 40 although it is still secured by a second bottom-most pin 41 and an angle bar 40E. The operator then would re-insert the removed pin 41 through the aligned apertures 25 on the sides 20A and 20B of column 20 to a bottom position wherever desired. Angle bar 40E prevents the work table 40 from pivoting forward about the bottom pin 41 upon removal of the top pin 41. The table 40 is then raised to disengage from the pin 41 inserted through the aligned bottom-most apertures 25 and 42A and lowered to permit the open, bottom-most aperture 42A on the work table 40 to engage the re-inserted pin 41. The work table 40 is then pivoted about this bottom pin 41 until the upper apertures 42 of both the work table 40 and the apertures 25 of the side walls 20A and 20B of the center column 20 are aligned and, upon alignment, thereof, the work table 40 may be secured in the new position by the re-insertion of the pin 41 through the aligned upper apertures.

It will be appreciated that the triangular, generally open design of the work table coupled with the manner in which the table 40 is secured to the column 20 permits an operator to readily reposition the work table without resorting to mechanical aids such as, for example, a motorized winch.

As shown in FIGS. 1, 2 and 10, an adjustable, self-storing leveling or support device 50 is provided at the front edge 40B of the work table 40 to provide support for a workpiece mounted on the table during operation of the press. For example, when performing a pressing operation on a brake hub and drum, support must be provided for the drum due to its size. Leveling device 50 comprises an adjustable, self-storing U-shaped leveling bar 52 having a center portion 52A and two opposed side portions 52B and 52C extending perpendicularly from the center portion 52A. Grooves 53 are provided along substantially the entire longitudinal extent of the side portions 52B and 52C. Leveling bar 52 is adjustably mounted on the front edge of the work table 40 with each side portion 52B and 52C captured between a tubularly shaped middle portion 54 extending along front portion 40B of the work table 40 and clamp plates 55 secured to both side portions 52B and 52C. A rod 56, threaded at one end thereof, passes through the middle portion 54 and extending outwardly at both ends thereof through the grooves 53 on both opposed side portions 52B and 52C and through clamp plates 55 on both side portions of the work table 40. A shaped shoulder 58 is provided at one end of the rod 56 to fit one of said clamp plates 55 capturing one side portion 52B between the middle portion 54 and the clamp plate 55 at that side of the work table 40. An adjustable wing nut 57 is threadably secured to the other side of the rod 56 thus capturing the other side portion 52C of the bar between the middle portion 54 and the clamp plate 55 on the other side of the work table 40. Clamp plates 55 include two apertures, one of which, 59A receives the ends of the rod 56 while a second aperture 59B is adapted to be aligned with an aperture on the side portion 40D of the work table 40 so that a pin 60 may be inserted through both aligned apertures to fix the position of each clamp plate 55 relative to the work table 40.

By loosening the wing nut 57 thereby releasing tension between the bar 52 and the middle, the operator may re-adjust the position of the leveling bar 52 to a desired location for supporting a workpiece and then lock the bar 52 in place by tightening the wing nut 57 which generates sufficient pressure against the clamp plate thereby locking the bar 52 in a fixed position. Leveling bar 52 is adjustable to the extent that the bar 52 pivots about rod 56 which passes through the grooves 53. When not in use, the bar 52 may be slid down, as shown in FIG. 2, with the side portions 52B and 52C positioned along side portions 40D of the work table 40. When the leveling bar 52 is to be used, as shown in FIG. 10, the wing nut 57 may be loosened, the bar moved upward to a desired position and then locked into place by tightening the wing nut 57. Since the leveling bar 57 pivots around the rod 56, it can be pivoted about almost a 300° circle and can be raised to substantially the full longitudinal extent of the grooved side positions 52B and 52C. The use of pin 59 serves to prevent the clamp plate 55 from rotating and assures that, when the wing nut is tightened, the bar 52 will remain fixed in place.

As shown in FIGS. 1 and 9, a self-storing nesting block 70 is provided within the front channel 20, positioned generally between the work table 40 and the ram housing 30. Nesting block 70 serves as a holder or anvil for holding press tooling such as, swedging tooling for brake hub and drum work. The nesting block 70, which includes a center aperture 71 is secured between two outwardly extending opposed arm portions 72A and 72B by bolts 73. Arm portions 72A and 72B are pivotably mounted at their ends opposite the nesting block 70 on a rod 74 which extends across the width of the front channel 21 and is secured to the side walls 20A and 20B of the center column 20 by nuts 75. In this manner, the nesting block 70, when not in use, can be stored in a non-operative, vertical position between the ram 35 and the work table 40 and is ready to use. Nesting block 70 is retained in a vertical position by an eccentrically weighted latch 77. A notched rod 134 extending between arm portions 72A and 72B and secured thereto by bolts 135 insures proper alignment of the nesting block 70 relative to the ram 34 by a locking collar 136 which is adapted to engage the rod 74. Locking collar 136 may be adjusted along the axis of the rod 74 to provide for proper horizontal alignment.

Storage means are provided for tooling to be used in conjunction with the press at two locations. As shown in FIGS. 1 and 4, a U-shaped rack 80 is provided on the external side of at least one side wall 20A, secured to the side wall by bolts 81. Rack 80 includes a back 80A and two outwardly extending sides 80B and 80C. A plurality of apertures 82 and slots 83 are provided in the sides 80B and 80C, which are adapted to receive and retain tooling used for pressing operations. For example, adapters, anvils, punches, pushers and swedges may be stored on this rack 80.

Additional storage means are provided within in the rear channel 22 for receiving and retaining block type tooling used in the operation of the press. For example, inner race removers, bearing shields and bearing installation fixtures may be stored within a cabinet 85 having a plurality of downwardly angled storage slots 86. As shown in FIGS. 2 and 3, cabinet 85 is mounted within and secured to rear channel 22 by a plurality of bolts.

The press 10 may be operated either manually using conventional mechanical assistance means or by an air/hydraulic system as shown in greater detail in FIGS. 4 through 8. This system is schematically illustrated in FIG. 5.

As shown in the schematic diagram of FIG. 5, air A is introduced into the hydraulic system of the hydraulic embodiment of the invention through an air filter/regulator 101, generally set at a pressure on air gauge 102 of about 95 pounds per square inch, and then directed through tube 103 to a foot valve assembly 105. Foot controls 106 and 108 are provided respectively for a high pressure press valve 107 and a low pressure blow-down valve 109. The press valve 107 is used for high pressure operation of the press, i.e., at pressures between about 10,000 psi and 25 tons while the blow-down valve 109 is used for low pressure operation of the press, i.e., at below 500 psi or for the rapid advance of the ram under minimum resistance to an operating position in order to reduce time in press operation.

Depending upon the operation desired, as selected by the operator with foot controls 106 and 108, air, under a prescribed pressure, is fed directly through tube 111 to a reservoir 110 if low pressure operation is desired or through tube 121 to a pump 120 if high pressure operation is selected. Pump 120 is of a conventional design and is adapted to draw oil upwards from the reservoir 110 through filter 112 and tube 114 and deliver it by delivery tube 122 to the ram 34 under a pressure of up to about 10,000 psi as measured by the gauge 35 to effect high pressure operation of the press.

When low pressure operation is desired, air under pressure is introduced directly from the blow-down valve 109 through tube 111 into the reservoir 110 which forces oil upwards through the filter 112 and tube 114 to activate the ram 35 in a similar manner as in the high pressure mode but at a significantly lower pressure.

A manifold 130 is provided with a relief valve 132 which serves to release excess pressure when the hydraulic pressure at that point exceeds 10,000 psi. A portion of the hydraulic oil is automatically returned to the reservoir 110 through tube 133. Additionally, a manual release valve 134 is provided to return a portion of the hydraulic oil back to the reservoir 110 through tube 133 when the operator wants the ram 35 to retract at low pressure.

The reservoir 110 of the present invention, preferably stainless steel, is shown in greater details in FIGS. 6 through 8. Reservoir 110 comprises a generally circular tubular portion 110A enclosed at both ends by upper and lower caps 110B and 110C, respectively. Bolts 110D are provided to secure upper and lower caps 110B and 110C to the circular tubular portion 110A. A drain 113 is provided in lower cap 110C. A number of ports are provided on the upper cap 110B including a suction port 117A, a relief port 117B, a return port 117C, a fill port 117D and a pressure port 117E. Delivery tube 114 extends through the suction port 117A of the upper cap 110B into the reservoir 110 through a pipe union 115 and a hix nipple 116 and is secured at its lower end to a filter 112 having a screen covered, annular opening so as to permit easy flow of hydraulic oil from the reservoir through the delivery tube 114 into the pump 120.

As shown in FIGS. 6 and 7, a pressure relief valve 140 is provided at relief port 117B. A removable cap 142 is provided at fill port 117D where additional hydraulic fluid can be added to the reservoir 110 when required.

As shown in FIG. 7, return port 117C accepts a fitting 144 which connects tube 133 from the manifold 130 to pipe 133A which extends into the hydraulic fluid within the reservoir and permits return of the hydraulic fluid to the reservoir 110.

A right angle street elbow fitting 146 is connected to the pressure port 117E and permits introduction of air under pressure from the blow-down valve 109 through tube 111 into the reservoir 110 for low pressure operation of the press. The use of the elbow fitting 146 serves to diffuse the air as it is introduced from the blow-down valve 109 into the reservoir 110 and thus serves to reduce the velocity of the entering air and reduce agitation of the hydraulic fluid.

As shown in FIG. 3, the hydraulic system may be mounted on the rear channel 22 of the column 20 by mounting bracket 150 which is bolted to one of the side walls 20B of the column 20.

Having thus described the invention with particular reference to the preferred forms thereof, it will be obvious that various changes and modifications may be made therein without departing from the spirit and scope of the invention as defined in the appended claims.

What is claimed is:

1. A center column press for use in automotive related applications, said press comprising:
   a vertical center column mounted on a base, said column having a vertically extending center wall interconnecting two vertically extending side walls to define at least one vertically extending channel on each side of said center wall;
   press means contained within one of said channels, said press means including a moveable ram adapted to travel in a vertical direction to effect a pressing operation; and
   a work table adjustably mounted on said center column within said one channel between said press means and said base.

2. The press of claim 1 wherein said work table includes an adjustably mounted self-storing leveling bar.

3. The press of claim 1 further including storing means on said other channel for storing press tooling.

4. The press of claim 1 further including within said one channel a pivotably mounted, self-storing nesting block.

5. The press of claim 1 further including storing means on one of said side walls for storing press tooling.

6. The press of claim 1 wherein said ram is activated by an air/hydraulic system.

7. The press of claim 6 wherein said air/hydraulic system includes means to effect high and low pressure operation of said press.

8. The press of claim 7 wherein said means to effect low pressure operation of said press comprises a blow-down valve adapted to introduce air under pressure into a hydraulic fluid containing reservoir to force said fluid into a pump which effects movement of said ram.

9. The press of claim 8 wherein an elbow fitting is provided between said blow-down valve and said reservoir to reduce the velocity of the air entering the reservoir.

10. A center column press for use in automotive related applications, said press comprising:
    a center column mounted on a base, said column having a vertically extending center wall interconnecting two vertically extending side walls to define at least one vertically extending channel on each side of said center wall;
    hydraulic press means mounted within one of said channels, said press means including a moveable hydraulic powered ram adapted to travel in a vertical direction to effect a pressing operation;
    an air/hydraulic system to power said ram, said system including means to effect high and low pressure pressing operations; and
    an adjustable work table adjustably mounted on said center column within said one channel between said press means and said base.

11. The press of claim 10 wherein said means to effect a low pressure pressing operation includes a blow-down valve adapted to introduce air under pressure into a reservoir of hydraulic fluid in order to force said fluid into a pump to effect movement of said ram.

12. The press of claim 11 wherein a right angle elbow fitting is provided through which air is introduced into said reservoir in order to reduce the velocity of the air entering said reservoir.

13. A center column press for use in automotive related applications, said press comprising:
    a center column mounted on a base, said column having a vertically extending center wall interconnecting two vertically extending side walls to define at least one vertically extending channel on each side of said center wall;
    press means mounted within one of said channels, said press means including a moveable ram adapted to travel in a vertical direction to effect a pressing operation;
    an adjustable work table adjustably mounted on said center column with said one channel between said press means and said base; and
    a nesting block pivotably mounted to said column within said one channel between said press means and said work table.

14. The press of claim 13 further including storage means for press tooling in said other channel.

15. The press of claim 14 wherein said press tooling comprises V-blocks and wherein said storage means comprises a plurality of shelves for said blocks.

16. The press of claim 15 further including storage means for press tooling on one of said side walls.

17. The press of claim 16 further including an adjustable leveling bar on said work table.

18. The press of claim 17 wherein said nesting block includes means to align said nesting block relative to said ram and said work table.

19. The press of claim 18 wherein said work table includes means to prevent said table from pivoting during re-adjustment thereof.

* * * * *